US010719287B2

(12) United States Patent
Brown et al.

(10) Patent No.: US 10,719,287 B2
(45) Date of Patent: Jul. 21, 2020

(54) VEHICLE VIDEO DISPLAYS

(71) Applicant: FORD GLOBAL TECHNOLOGIES, LLC, Dearborn, MI (US)

(72) Inventors: Kristopher Karl Brown, Dearborn, MI (US); Cornel L. Gardner, Romulus, MI (US); Chad Matthew McCarty, Canton, MI (US); Stuart C. Salter, White Lake, MI (US); David Brian Glickman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/188,407

(22) Filed: Nov. 13, 2018

(65) Prior Publication Data

US 2020/0150915 A1 May 14, 2020

(51) Int. Cl.
*G06F 3/14* (2006.01)
*G06F 3/0488* (2013.01)
*G06F 3/01* (2006.01)
*B60R 25/23* (2013.01)
*B60S 1/56* (2006.01)
*B60S 1/02* (2006.01)
*G09F 21/04* (2006.01)
*G07C 9/00* (2020.01)
(Continued)

(52) U.S. Cl.
CPC ............ *G06F 3/1446* (2013.01); *B60R 25/23* (2013.01); *B60S 1/023* (2013.01); *B60S 1/56* (2013.01); *G05D 1/021* (2013.01); *G06F 3/011* (2013.01); *G06F 3/04886* (2013.01); *G06F 3/1454* (2013.01); *G07C 9/00912* (2013.01); *G09F 21/048* (2013.01); *G05D 2201/0212* (2013.01); *G09F 9/33* (2013.01)

(58) Field of Classification Search
None
See application file for complete search history.

(56) References Cited

U.S. PATENT DOCUMENTS 7,248,151 B2    7/2007  McCall
8,994,495 B2 *  3/2015  Dassanayake ..... G07C 9/00174
                                              340/5.54
(Continued)

FOREIGN PATENT DOCUMENTS

DE    102010024573 A1   12/2011
DE    102014010663 A1    1/2015
WO       2017118628 A1    7/2017

OTHER PUBLICATIONS https://gizmodo.com/5863017/toyotas-insane-concept-car-has-giant-touch-screen-doors.
https://www.motor1.com/news/132960/audi-q8-concept-teaser-video/.
http://www.thedrive.com/sheetmetal/16032/new-mercedes-benz-upgrade-projects-the-amg-logo-from-your-car.

*Primary Examiner* — Kenneth B Lee, Jr.
(74) *Attorney, Agent, or Firm* — David Coppiellie; MacMillan, Sobanski & Todd, LLC

(57) ABSTRACT

A vehicle and a method of operating the vehicle may include activating a first touch screen, mounted on an exterior of the vehicle, illustrating a keypad and activating a first privacy screen in the first touch screen; and activating a second touch screen, mounted on the vehicle exterior, displaying information without activating a second privacy screen in the second touch screen. The touch screens may have built-in heaters, produce ads based on user distance from the vehicle and provide countdown timers for ride-share vehicle departure time.

10 Claims, 4 Drawing Sheets

(51) Int. Cl.
    *G05D 1/02*     (2020.01)
    *G09F 9/33*     (2006.01)

(56) References Cited

U.S. PATENT DOCUMENTS

| | | | |
|---|---|---|---|
| 9,256,852 B1* | 2/2016 | Myllymaki | G06Q 10/083 |
| 10,057,400 B1* | 8/2018 | Gordon | G06Q 30/0269 |
| 10,269,273 B1* | 4/2019 | Borden | E04B 1/34336 |
| 2014/0136414 A1* | 5/2014 | Abhyanker | G06Q 50/28 |
| | | | 705/44 |
| 2015/0006005 A1* | 1/2015 | Yu | G05D 1/0297 |
| | | | 701/22 |
| 2015/0315839 A1 | 11/2015 | Shigemoto et al. | |
| 2016/0363991 A1* | 12/2016 | Schlecht | G06F 3/011 |
| 2017/0213164 A1* | 7/2017 | Rainbolt | G06Q 10/02 |
| 2017/0228549 A1* | 8/2017 | Xuan | G06F 21/62 |
| 2019/0137290 A1* | 5/2019 | Levy | G05D 1/0214 |

\* cited by examiner

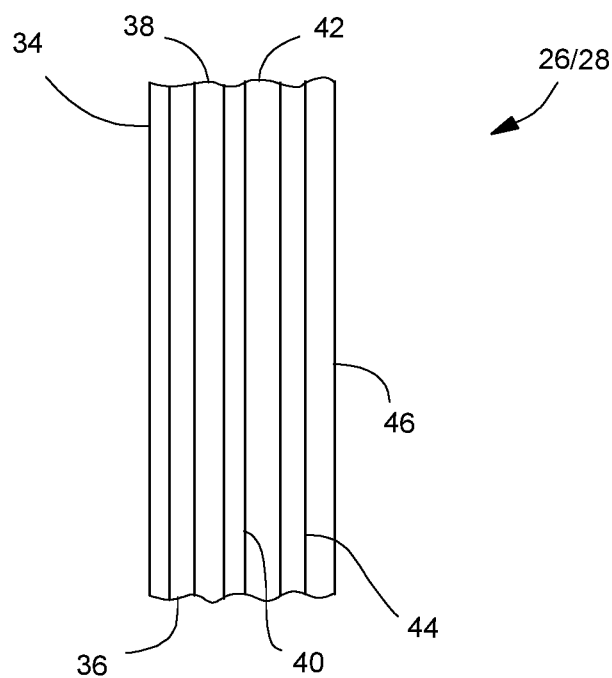
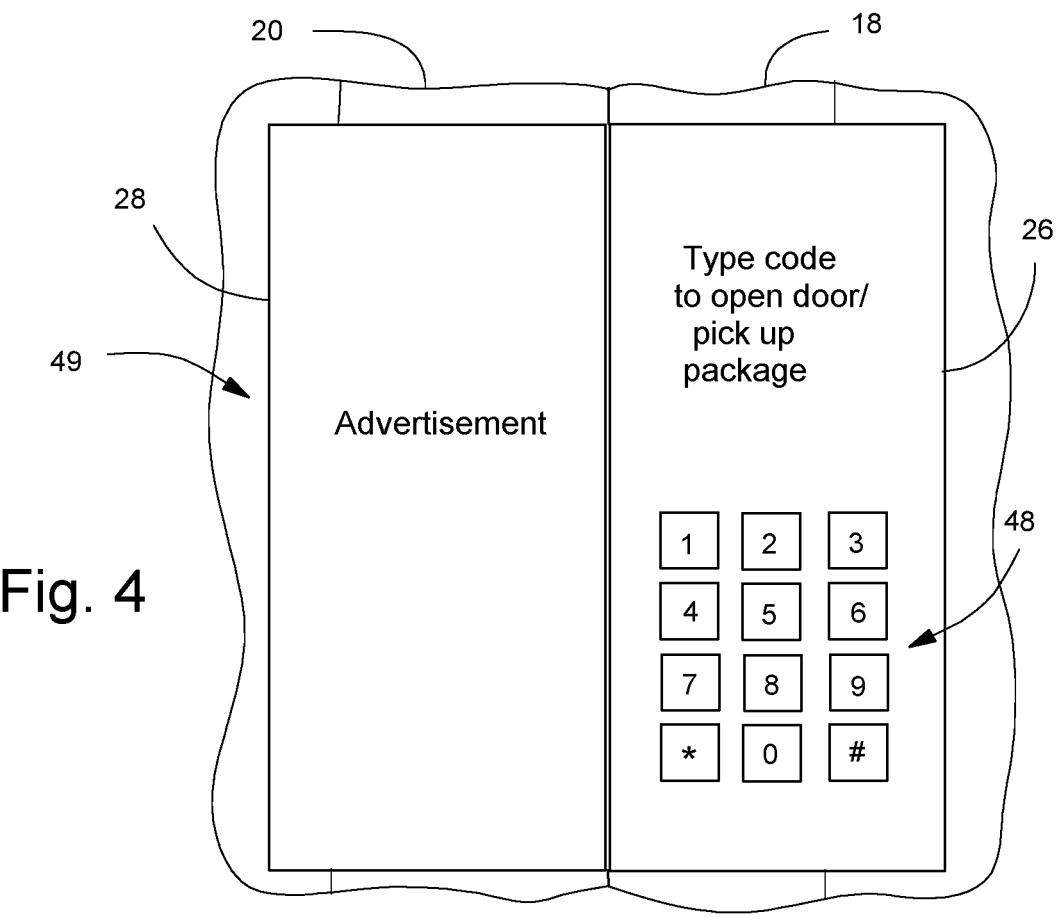

VEHICLE VIDEO DISPLAYS

BACKGROUND OF THE INVENTION

The present invention relates to vehicles having exterior video displays.

New types of automotive vehicle use are arising, different from the conventional owner-operator model of vehicle use. Such new uses may include, for example, ride sharing and autonomous vehicles. These new types of vehicle use may need new ways for providing security and for generating revenue from the vehicles.

SUMMARY OF THE INVENTION

An embodiment contemplates a method of operating a vehicle comprising: activating a first touch screen, mounted on an exterior of the vehicle, illustrating a keypad and activating a first privacy screen in the first touch screen; and activating a second touch screen, mounted on the vehicle exterior, displaying information without activating a second privacy screen in the second touch screen.

An embodiment contemplates a method of operating a vehicle comprising: activating first and second touch screens mounted on an exterior of the vehicle to display information; and detecting a distance of a person from the vehicle, with the information displayed based on the detected distance.

An embodiment contemplates a method of operating a vehicle comprising: activating first and second touch screens mounted on an exterior of the vehicle to display information; and upon a person touching a predetermined location on one of the first and second touch screens, transferring information from the first and second touch screens to a wireless phone as the person enters the vehicle.

An advantage of an embodiment is that a privacy screen provides security for one entering/interacting with the vehicle while still allowing for other information to be displayed. The information displayed on the display may be adjusted for the distance a person is from the video display, which distance may be calculated using a vehicle's LIDAR/RADAR, ultrasonic or BLE signal. Advertisements or other information may be downloaded onto a person's cell phone upon entering the vehicle. A countdown timer built into an advertisement may prove helpful to one taking a trip in an autonomous ride sharing vehicle.

BRIEF DESCRIPTION OF THE DRAWINGS

FIG. 3 is a schematic view of a side view of layers on a touch screen video display.

FIG. 4 is a schematic view of touch screens mounted on a side of the vehicle.

DETAILED DESCRIPTION

Figure 1:
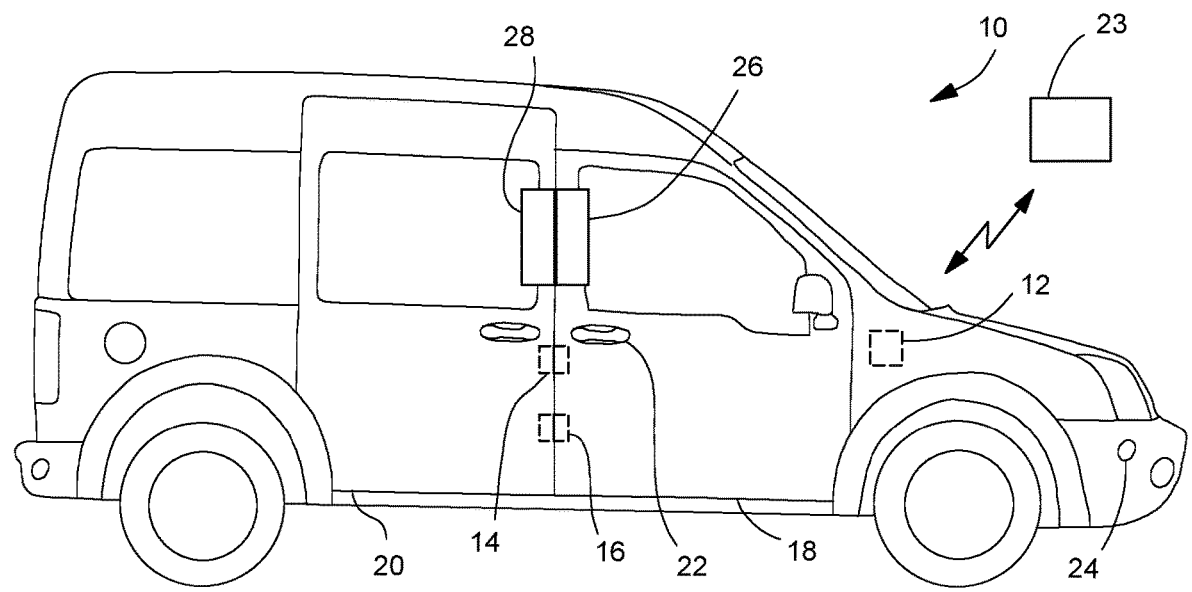
FIG. 1 is a schematic side view of a vehicle, with a rear sliding door closed.
Figure 2:
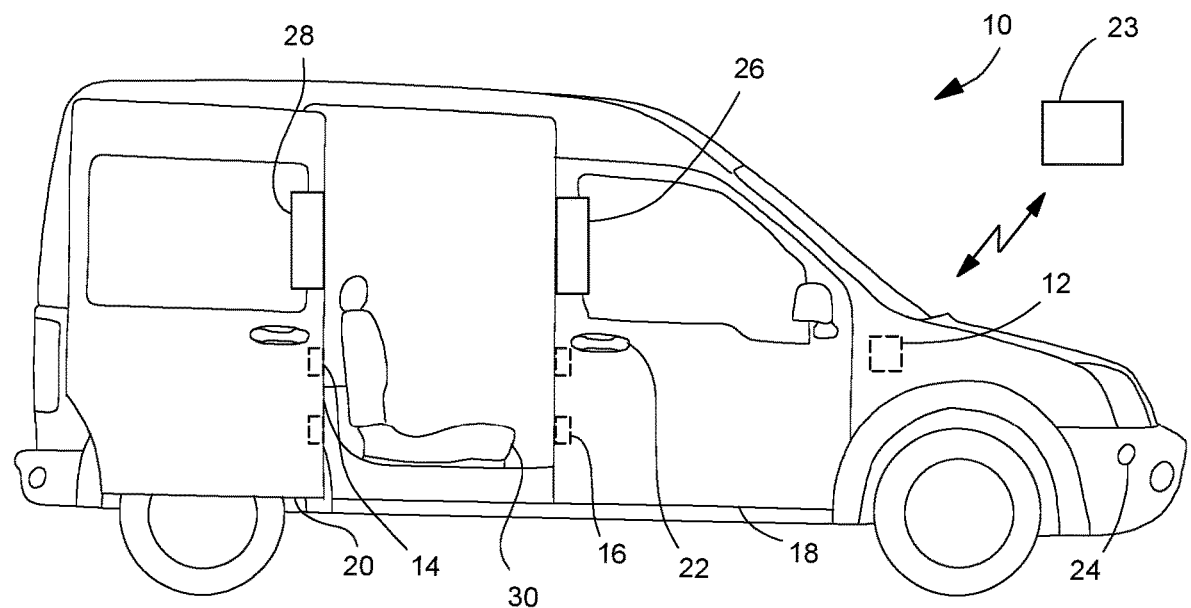
FIG. 2 is a view similar to FIG. 1, showing the rear sliding door in an open position.
Figure 5:
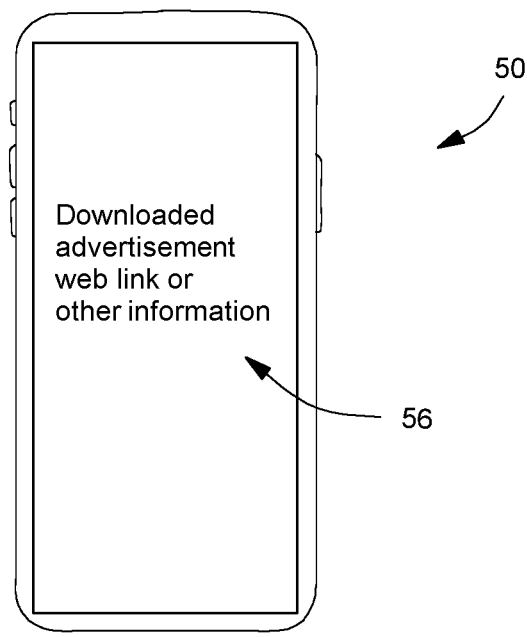
FIG. 5 is a schematic view of a cell phone.

FIGS. 1-7 illustrate a vehicle 10, which may be an autonomous and/or a ride-share vehicle that selectively allows entrance to the vehicle for riding therein, for example in a seat 30, or picking up an item from within the vehicle 10, from for example a locked storage box 32.

The vehicle 10 may include a controller 12 that is configured to control door locks 14 and actuators 16 on front doors 18 and rear doors 20. The actuators 16 may selectively open and/or close the doors 18, 20. Optionally, each door 18, 20 may include door handles 22 for opening and closing the doors 18, 20. The controller 12 may be in wireless communication with a remote computer system 23, such as an internet (cloud) based system to exchange information with the vehicle 10. The controller 12 may be a separate controller or may be integrated into another vehicle controller, such as for example a body controller.

The controller 12 may also be in communication with vehicle sensors 24, either directly or indirectly through other vehicle controllers. Such sensors 24 may include for example, light detection and ranging (LIDAR) sensors, radio detection and ranging (RADAR) sensors, Bluetooth low energy (BLE) sensors, ultrasonic sensors and/or cameras with image recognition. Since these sensors are known to those skilled in the art for vehicle use, they will not be discussed in detail herein. Moreover, many vehicles already include such sensors, or combinations of these sensors, for different vehicle purposes and so will not require additional vehicle hardware to be added to provide the functions described herein.

The controller 12 is also in communication with a front video display 26 and a rear video display 28 on each side of the vehicle 10. The front video displays 26 may be mounted on the front doors 18 and the rear video displays 28 may be mounted on the rear doors 20 such that when adjacent doors 18, 20 are closed, the displays 26, 28 are adjacent and may appear generally as a single display. When either a front or rear door is open, then the displays 26, 28 are separated and appear and operate separately.

The displays 26, 28 may be touch screen displays, which may be for example capacitive, resistive, infrared, optical imaging, or other type of suitable touch screen that provides interactive communication with someone next to the vehicle 10.

The touch screens 26, 28 may be made up of different layers to provide the desired functionality of the screens 26, 28. FIG. 3 illustrates an example of one possible makeup of layers to produce the screens 26, 28. The outer layer 34 may be a type of glass, such as Gorilla glass, that forms a resilient non-scratch surface upon which one presses. The adjacent layer 36 may be a titanium dioxide self-cleaning surface on the inner surface of the outer layer 34. The next layer inboard 38 may be a flooded X-capacitive sensor pattern of indium tin oxide. Adjacent to that is a layer 40 of heater film that is optically clear so as not to distort light from light emitting diodes (LEDs). Since the screens 26, 28 are mounted on the outside of the vehicle 10, the heater film 40 may be employed to melt ice and snow from the displays 26, 28 on cold days.

Inboard of that layer 40 may be a privacy screen layer 42 that allows viewing from generally straight-on but selectively prevents the image on the display from being seen at an angle. This layer may cover entire screens 26, 28 or may only be employed for portions of the screens 26, 28 where a keypad or other user input information may be displayed from time-to-time. Such a privacy screen layer 42 may provide security by preventing people other than the one entering codes into the touch screen(s) from seeing the codes. Such codes may unlock a door for vehicle entry during ride-sharing operations or unlock a storage box 32, allowing one to remove the item in the particular box 32.

Inboard from the privacy screen layer 42 may be an LED layer 44 that selectively lights the screens 26, 28 to produce the images. Additionally, an inboard-most layer may be a thermally conductive layer 46 that can act as a heat sink by attachment to the vehicle itself. Such a build-up of layers may be for example about two to three millimeters thick, allowing for relative flushness to the vehicle 10. For the layers discussed above, the specific makeup and operation of such layers are known in the art and so will not be discussed in further details herein.

FIG. 4 illustrates a use for the displays 26, 28, whether the vehicle 10 is being employed for ride-sharing or package delivery. In this example, the controller 12 activates the front touch screen 26 with a keypad 48 for entry of a code and activates the privacy screen layer 42, thus limiting who can see this front display 26, while the controller 12 activates the rear display 28 with an advertisement 49 without the privacy screen layer 42 activated thus allowing for broad viewing the advertisement 49. The keypad 48 may be on the rear screen 28 and the ad 49 on the front screen 26 instead, if so desired. For security, the controller 12 may scramble the numbers on the keypad image 48, thus making it more difficult for onlookers to determine the code being entered, if so desired.

In a package delivery mode, the code being entered into the keypad image 48 on the front screen 26 may open, for example, a rear door 20, exposing the storage boxes 32 and unlocking the box corresponding to that code, thus allowing one to retrieve an item from that box 32. The particular box number 32 within which the item is located may be displayed on one of the screens 26, 28 upon entry of the code—this box number may be displayed on a portion of a screen with the privacy screen layer 42 activated.

In ride-sharing mode, the code being entered into the keypad image 48 on the front screen 26 may unlock and open a door 18/20, allowing the passenger to enter the vehicle 10. In addition, the controller 12 may provide in the advertisement 49 on the screen 28 a selection one may make on a mobile device, such as a cell phone 50 (FIG. 5), to move the advertisement to the phone 50 upon entering the vehicle 10—such an ad may include for example a link to a web site or a user application. The touch screen 28 displaying the ad may invite the person to touch the screen 28 if wanting the ad, web link or other information 56 to move to the person's phone 50. This allows one, while being transported in the ride-share vehicle 10, to respond to the cell phone advertisement web link, etc. 56. The controller 12 may also receive instructions to randomly pay for a person's ride by the advertiser or offer discount coupons to the rider to create greater interaction between the rider and advertising 49 displayed on the screens 26, 28.

Upon the vehicle door(s) 18, 20 closing, and the vehicle 10 driving off to a new destination, the displays 26, 28 may provide advertising 49, employing the displays combined for one ad 49 or a separate ad 49 on each display 26, 28. In this case, the privacy screen layer 42 may be deactivated for both screens 26, 28 in order to provide for maximum viewing of the ads 49. One or more of the vehicle sensors 24 may be employed to detect a distance from the vehicle 10 that people in the vicinity of the vehicle 10 are located and display a particular ad 49 based on this distance, thus assuring clear viewing of the ad 49. The distances may be calculated for people on each side of the vehicle 10, with different ads 49 on each side of the vehicle 10 based on the different distances that people are from the vehicle 10. The particular ads 49 being displayed may also be based on the current location of the vehicle 10, the next ride-sharing pick-up location and/or the destination for drop-off of the riders in the vehicle 10. Such information may be provided via the remote computer system 23 and/or a vehicle GPS system, which is known in the art.

Figure 6:
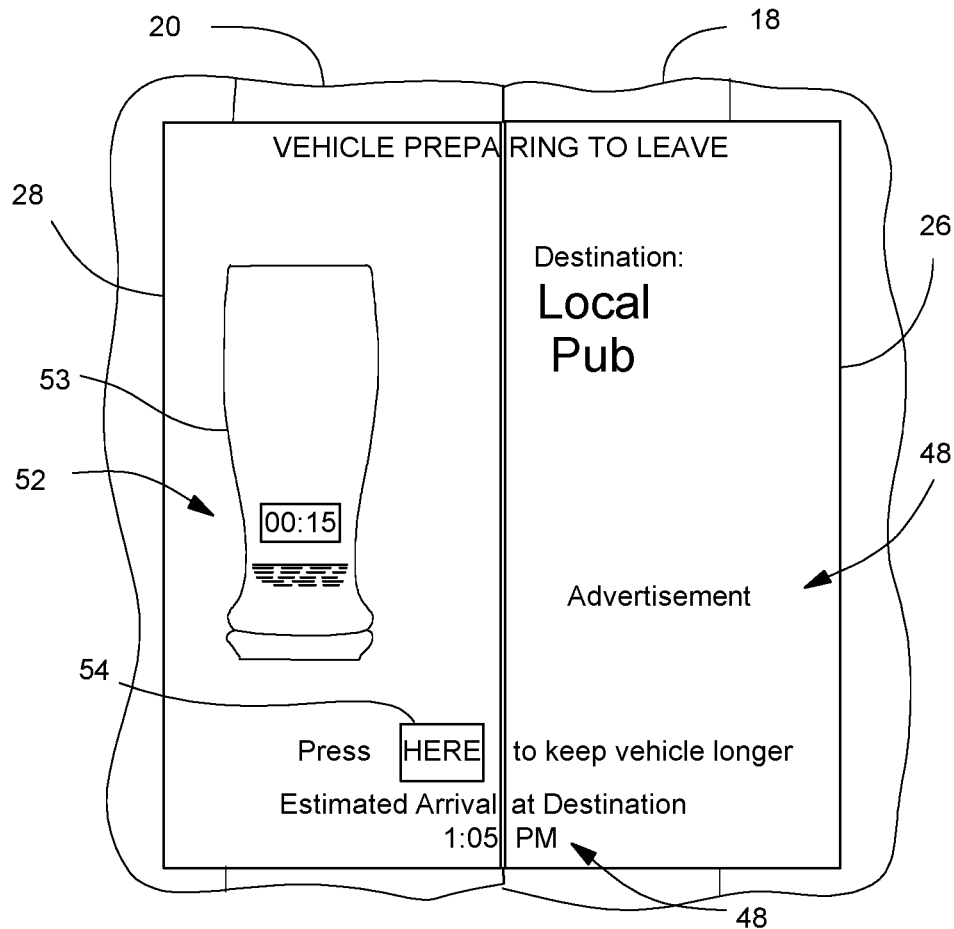
FIG. 6 is a view similar to FIG. 4, but with different information displayed on the touch screens.
Figure 7:
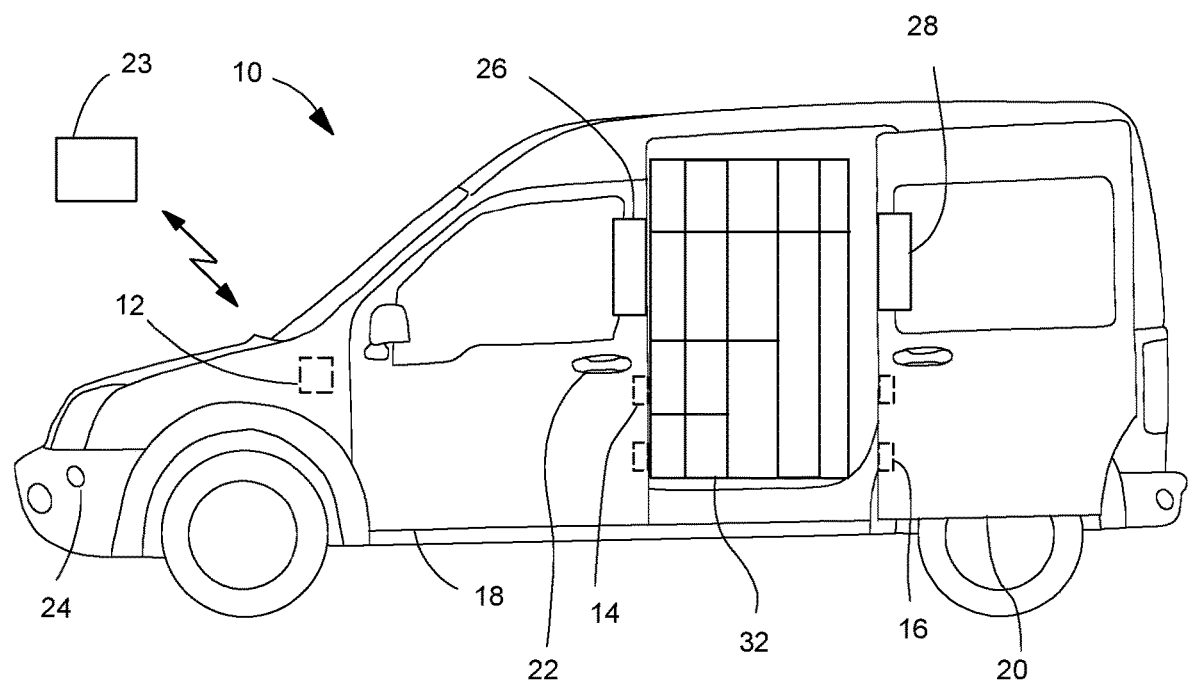
FIG. 7 is a view similar to FIG. 2, illustrating the opposite side of the vehicle.

In addition, when the vehicle 10 is operating in a ride-sharing mode, the displays 26, 28 may be employed to not only display advertisements while waiting to depart but may also display a countdown timer 52 to departure (FIG. 6). The countdown timer 52 may be both in numerical form and an image, for example the amount of time to departure to a pub may be reflected by an image of the remaining amount of a drink in a glass 53 displayed on a screen 28. Such a display of departure timing may also include activating a portion 54 of one of the screens 26 that allows for pressing by the ride-share person to delay departure of the vehicle 10. An estimated time to arrival 58 may also be presented on the screens 26, 28. Thus a ride-share person may easily obtain the information relative to this particular ride from outside of the vehicle 10.

While certain embodiments of the present invention have been described in detail, those familiar with the art to which this invention relates will recognize various alternative designs and embodiments for practicing the invention as defined by the following claims.

The invention claimed is:

1. A method of operating a vehicle comprising:
 activating a first touch screen, mounted on an exterior of the vehicle, illustrating a keypad and activating a first privacy screen in the first touch screen;
 activating a second touch screen, mounted on the vehicle exterior, displaying information without activating a second privacy screen in the second touch screen;
 unlocking a storage box located within the vehicle upon entering a predetermined code into the keypad;
 mounting the first touch screen on a front door and the second touch screen on a rear door, with the second touch screen adjacent to the first touch screen when the front and rear doors are closed; and
 providing a single advertisement across the first and second touch screens when the front and rear doors are closed, and providing different advertisement on the second touch screen than on the first touch screen when at least one of the front and rear doors are open.

2. The method of claim 1 further including, detecting a distance of a person from the second touch screen, and displaying the information on the second touch screen as an advertisement that is based on the detected distance.

3. The method of claim 1 further including, upon a person touching the second touch screen, the information on the second touch screen is transferred to a wireless phone of the person as the person enters the vehicle.

4. The method of claim 1 wherein the vehicle is an autonomous vehicle and the information on the second touch screen includes displaying a countdown timer to vehicle departure.

5. The method of claim 1 further including heating at least one of the first and second touch screens.

6. The method of claim 1 further including, unlocking a door upon entering a second predetermined code into the keypad.

7. A method of operating a vehicle comprising:
 activating first and second touch screens mounted on an exterior of the vehicle to display information;
 detecting a distance of a person from the vehicle, with the information displayed based on the detected distance; and mounting the first touch screen on a front door and the second touch screen on a rear door, with the second touch screen adjacent to the first touch screen when the front and rear doors are closed, and providing a single advertisement across the first and second touch screens when the front and rear doors are closed, and providing different advertisement on the second touch screen than on the first touch screen when at least one of the front and rear doors are open.

8. The method of claim 7 further including heating at least one of the first and second touch screens.

9. A method of operating a vehicle comprising:
activating first and second touch screens mounted on an exterior of the vehicle to display information;
upon a person touching a predetermined location on one of the first and second touch screens, transferring information from the first and second touch screens to a wireless phone as the person enters the vehicle, wherein the vehicle is an autonomous vehicle and the information on one of the first and second touch screens includes displaying a countdown timer to vehicle departure;
mounting the first touch screen on a front door and the second touch screen on a rear door, with the second touch screen adjacent to the first touch screen when the front and rear doors are closed; and
providing a single advertisement across the first and second touch screens when the front and rear doors are closed, and providing different advertisement on the second touch screen than on the first touch screen when at least one of the front and rear doors are open.

10. The method of claim 9 further including heating at least one of the first and second touch screens.

* * * * *